United States Patent [19]

Matsuda

[11] Patent Number: 5,659,404
[45] Date of Patent: Aug. 19, 1997

[54] IMAGE READING APPARATUS FOR READING BOOK-LIKE DOCUMENTS

[75] Inventor: Shinya Matsuda, Kyoto, Japan

[73] Assignee: Minolta Co., Ltd., Osaka, Japan

[21] Appl. No.: 638,078

[22] Filed: Apr. 26, 1996

[30] Foreign Application Priority Data

Apr. 28, 1995 [JP] Japan ................. 7-128957

[51] Int. Cl.$^6$ ................. H04N 1/04
[52] U.S. Cl. ................. 358/474; 358/488; 358/494; 358/497
[58] Field of Search ................. 358/497, 494, 358/488, 474, 464, 448, 461; 355/25, 75

[56] References Cited

U.S. PATENT DOCUMENTS

| | | | |
|---|---|---|---|
| 4,980,720 | 12/1990 | Siegel | 355/25 |
| 5,084,611 | 1/1992 | Okisu et al. | 250/208.1 |
| 5,105,286 | 4/1992 | Sakurai | 358/464 |
| 5,119,211 | 6/1992 | Sakurai | 358/464 |
| 5,159,187 | 10/1992 | Okisu et al. | 250/208.1 |
| 5,194,729 | 3/1993 | Okisu et al. | |
| 5,276,530 | 1/1994 | Siegel | 358/474 |
| 5,416,609 | 5/1995 | Matsuda et al. | 358/474 |
| 5,585,926 | 12/1996 | Fujii et al. | 358/488 |

*Primary Examiner*—Scott A. Rogers
*Attorney, Agent, or Firm*—McDermott, Will & Emery

[57] ABSTRACT

An image reading apparatus which reads document surface of open book-like document placed on a document platen in a face upward condition and detects height of the document. An image reader reads the document to output image data. A first detector detects a background luminance of the document in accordance with the image data. A second detector detects a height of document. A first determining device determines a background luminance distribution based on the background luminance of the document detected by the first detector. A second determining device determines a height distribution based on the height of document detected by the second detector. A first anomalies detector detects anomalies of the background luminance distribution. A second anomalies detector detects anomalies of the height distribution. A convertor converts the height distribution and the background luminance distribution each other. An interpolator interpolates each anomalies of the distributions using the other distribution converted by convertor. An warning device warns an impossibility of reading, when the interpolating is impossible.

18 Claims, 15 Drawing Sheets

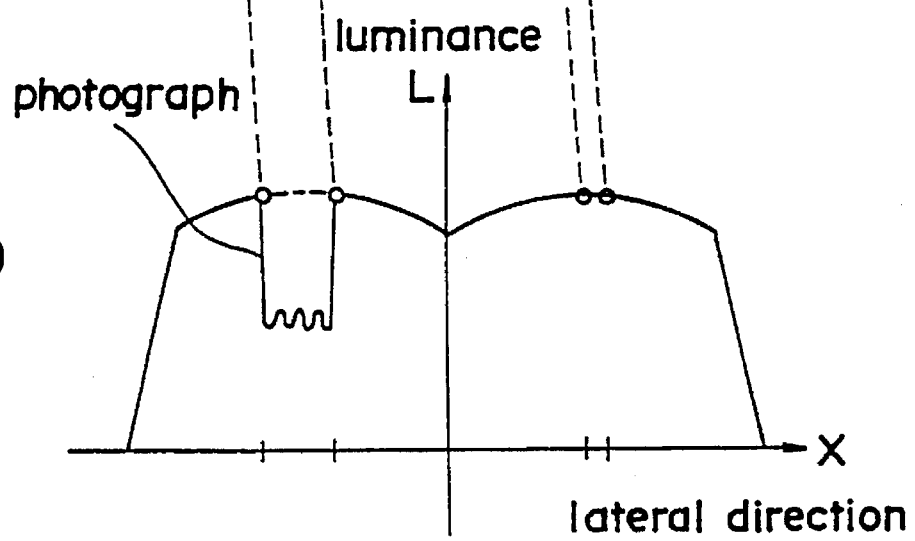
FIG. 9(a)
FIG. 9(b)
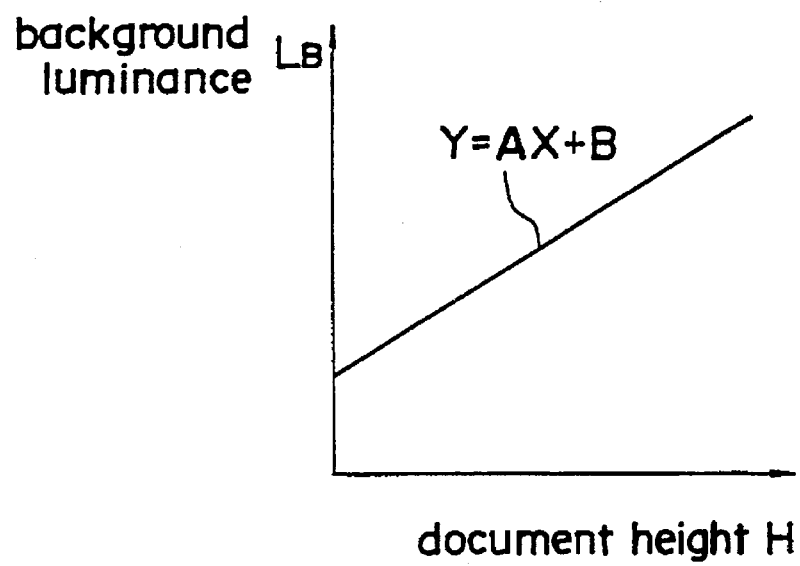
FIG. 10

FIG.21(a)
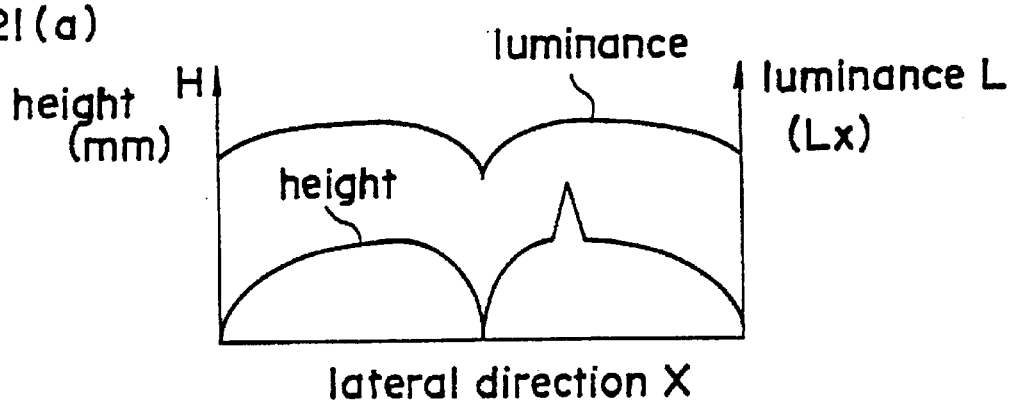
FIG.21(b) standardize
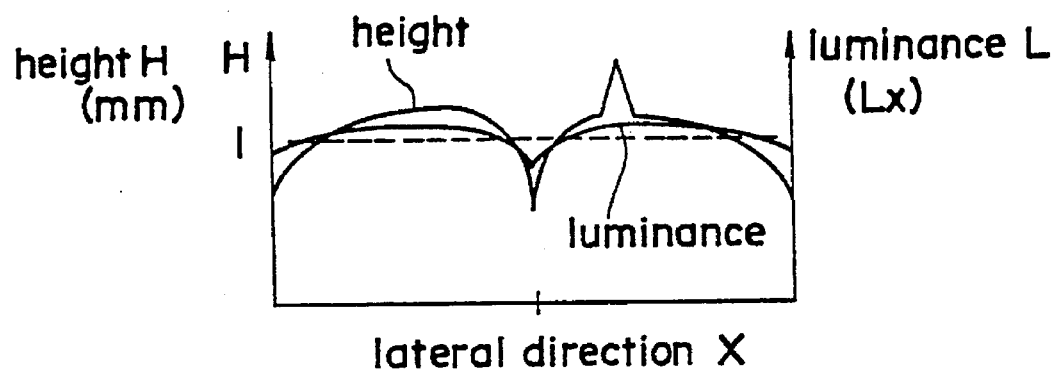
FIG.21(c) difference of the distributions
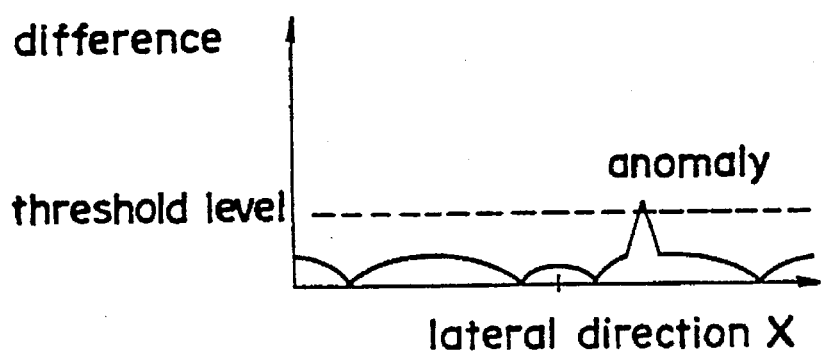

IMAGE READING APPARATUS FOR READING BOOK-LIKE DOCUMENTS

BACKGROUND OF THE INVENTION

1. Field of the Invention

The present invention relates to an image reading apparatus for reading thick documents such as books and the like, and specifically relates to art for detecting the height of a document such as a book and correcting image distortion in accordance with the detected document height, and art for detecting changes in background luminance arising from the curvature of a document when a document such as a book is placed open-faced on a document platen, and automatically correcting the density of the reproduced image in accordance with the detected changes in background luminance of the document.

2. Description of the Related Art

In conventional image reading apparatuses of this type, the shape of the portion corresponding to the head of a book document is read by a charge-coupled device (CCD) sensor or the like to measure the height distribution of a book document placed on a document platen in an open-faced state. When a stamp is pressed on the head of the book-like document to adhere attachments such as a label or the like, a problem arises in that the document height distribution cannot be obtained to correct for image distortion.

Conventional art is known to automatically correct the density of the reproduced image by detecting change in the .background luminance arising from the curvature of the book-like document and effecting said correction in accordance with the detected change in background luminance of the book-like document. When a photograph or the like is present in a part of the imaged page, however, the background luminance cannot be accurately measured, such that image density cannot be properly controlled.

SUMMARY OF THE INVENTION

A first object of the present invention is to correct abnormal areas arising from the height distribution of a book-like document, and correct image distortion in accordance with the height distribution after said correction.

A second object of the present invention is to correct abnormal areas arising from the background luminance distribution of a book-like document having changes in height in a subscan direction, without producing luminance irregularities in the subscan direction in accordance with the corrected background luminance distribution.

A third object of the present invention is to obtain accurate height distribution of a book-like document in the in height distribution detection of a book-like document by interpolation using the background luminance distribution of anomalous portions of the height distribution, and correcting image distortion arising during the reading of a book-like document.

A fourth object of the present invention is to obtain accurate background luminance distribution in a subscan direction of a book-like document in the background luminance distribution detection of a book-like document by interpolation using the height distribution of anomalous portions of the background luminance distribution, without producing luminance irregularities in a subscan direction arising during the reading of a book-like document.

These and other objects, advantages and features of the present invention will become apparent from the following description thereof taken in conjunction with the accompanying drawings which illustrate specific embodiments of the invention.

BRIEF DESCRIPTION OF THE DRAWINGS

FIG. 9(a)–9(b) shows the background luminance distribution of a document having a photographic image on the left page and the document height distribution of a document having a label affixed to the right page;

FIG. 10 illustrates the relationship between the document height and the detected background luminance;

FIG. 21(a)–21(c) illustrates the method of cross noise level detection of document height and luminance.

In the following description, like parts are designated by like reference numbers throughout the several drawings.

DESCRIPTION OF THE PREFERRED EMBODIMENTS

Figure 1:
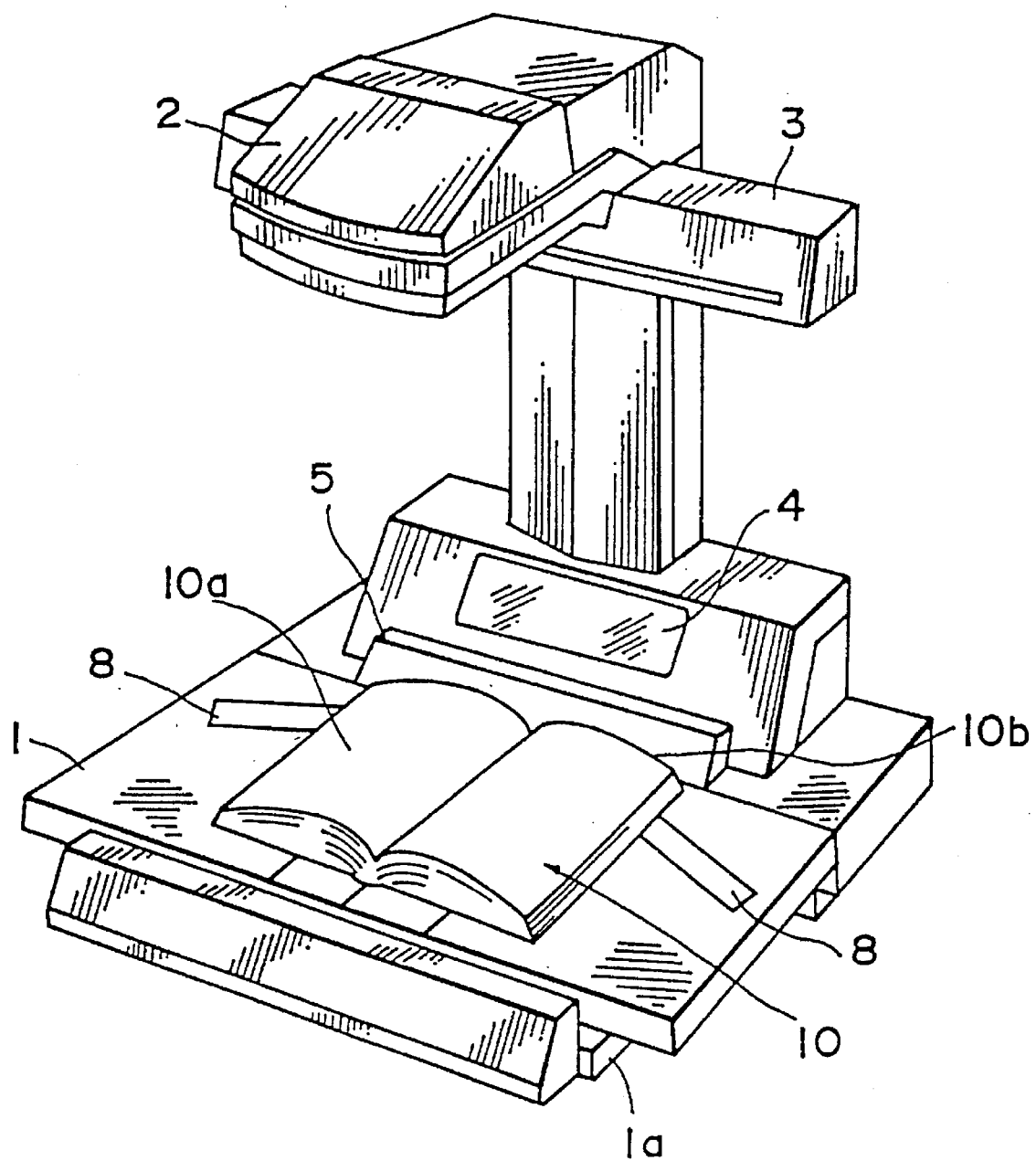
FIG. 1 is a perspective view showing the general construction of the image reading apparatus of the present invention.

The preferred embodiments of the present invention are described hereinafter with reference to the accompanying drawings. FIG. 1 shows the general construction of the image reading apparatus. An object document (hereinafter referred to as "book document 10") is [laced on document platen 1 in an open-faced state. Above platen 1 is provided an image sensing unit 2 for reading the open pages of book document 10 via optical scanning. Image sensing unit 2 has a line sensor 7 (refer to FIG. 2), which reads the open pages of book document 10 by moving in the arrow direction in FIG. 2. The document placement surface of document platen 1 is colored darker than the background color of a typical document, such that the document surface of book document 10 and the document placement surface can be discriminated when the book document 10 placed on document platen 1 is read.

The image reading apparatus is provided, above the interior side of document platen 1, with an illumination unit 3 for illuminating book document 10 on document platen 1, operation panel 4 for setting various image reading conditions and the like, mirror 5 arranged at an inclination on the interior side of document platen 1 for reflecting the head of book document 10, and a control unit (not shown in the drawings) for controlling the image sensing operations such as the prescan operation and main scan operation of image sensing unit 2. The positioning of book document 10 is accomplished by pushing book document 10 to the bottom edge of mirror 5. Accordingly, the boundary of document platen 1 and mirror 5 is the standard position of the document. Image data read by image sensing unit 2 is subjected to various processing by the control unit for output to a desired output device (e.g., a printer, computer or the like). Document platen 1 sits on a base 1a, and is constructed such that the right side plate and left side plate of document platen 1 are independently movable in vertical directions.

Each named part of book document 10 placed on document platen 1 is defined. Open-faced book document 10 refers to the entire area of both right and left pages; the surface read by image sensing unit 2 is referred to as document surface 10a; and the side surface of book document 10 on the interior side of the placed book document is referred to as document head 10b.

Figure 2:
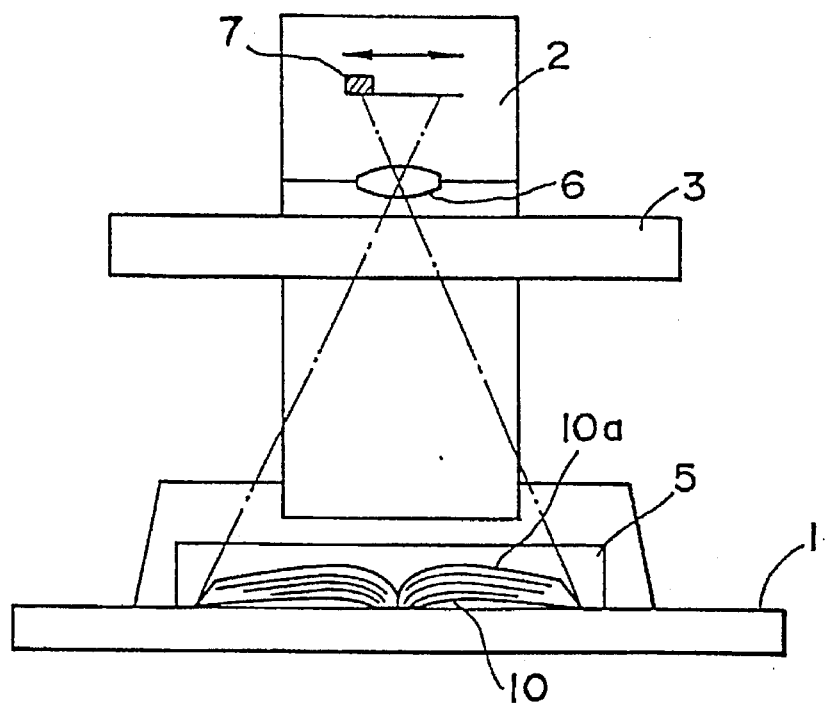
FIG. 2 briefly shows the construction of the image reading apparatus viewed from the front.
Figure 3:
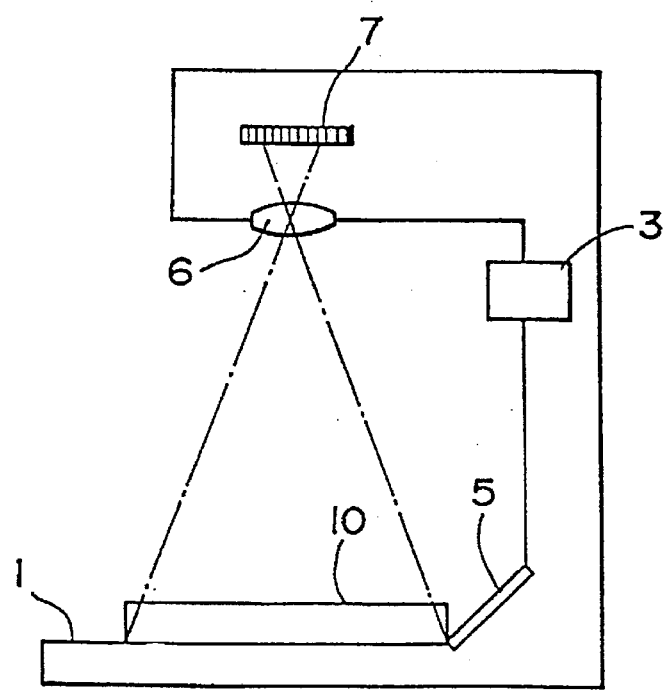
FIG. 3 briefly shows the construction of the image reading apparatus viewed from the side.

FIGS. 2 and 3 respectively show brief front and side views of the construction of the image reading apparatus. Image sensing unit 2 comprises an optical unit provided with a line sensor 7 having a linear array of a plurality of image sensing elements arrayed from the front side to the interior side (main scan direction), and an image forming lens 6 for projecting the image of book document 10 on line sensor 7. Line sensor 7 reads the image f document surface 10a and document head 10b reflected in mirror 5 by moving in a subscan direction (arrow direction in FIG. 2) perpendicular to the main scan direction on the image forming surface upon which the image of book document 10 is formed. Image forming lens 6 is provided so as to be movable in the direction of the optical axis by means of a lens drive device (not illustrated) of lens actuating unit 30 (refer to FIG. 16), and is moved in accordance with the height of book document 10 obtained by a height detection process described later so as to form and image of document surface 10a in a normally focused state on line sensor 7. Height detection mirror 5 is arranged at an inclination of 45° relative to the document placement surface of document platen 1 and extends in the subscan direction on the interior side of document platen 1 so as to reflect document head 10b of document 10 placed on document platen 1. Document head 10b reflected in mirror 5 is projected onto line sensor 7 via lens 6 together with document surface 10a. Line sensor 7 is provided with a length just sufficient for reading the image of the projected document surface 10a and document had 10b, and simultaneously reads the image of document surface 10a and document head 10b via a scanning movement. Although a line sensor is used in the present embodiment, it is to be noted that alternatively an area sensor may be used. When book document 10 placed on document platen 1 is placed open-faced and facing upward, document surface 10a has a spatially curved shape in the vertical (height) direction. It is necessary, therefore, to detect the height of book document 10 at various positions in the subscan direction, and adjust the distortion of the read image and focus the image formed on line sensor 7 in accordance with said detected height.

Figure 4:
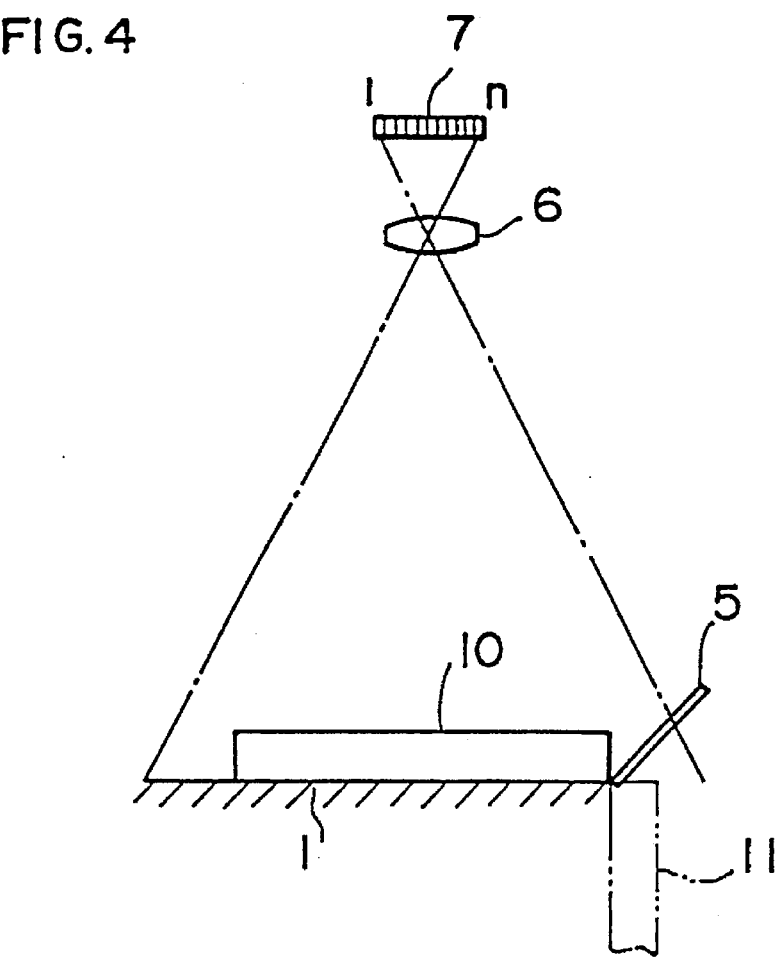
FIG. 4 illustrates the principle of the height detection process.

FIG. 4 illustrates the principle of the height detection process. With book document 10 placed at a predetermined position, an image 11 of book head 10b is reflected in mirror 5, and the height distribution of book document 10 is determined by reading the image 11 of book head 10b reflected in mirror 5 via the line sensor 7.

Figure 5:
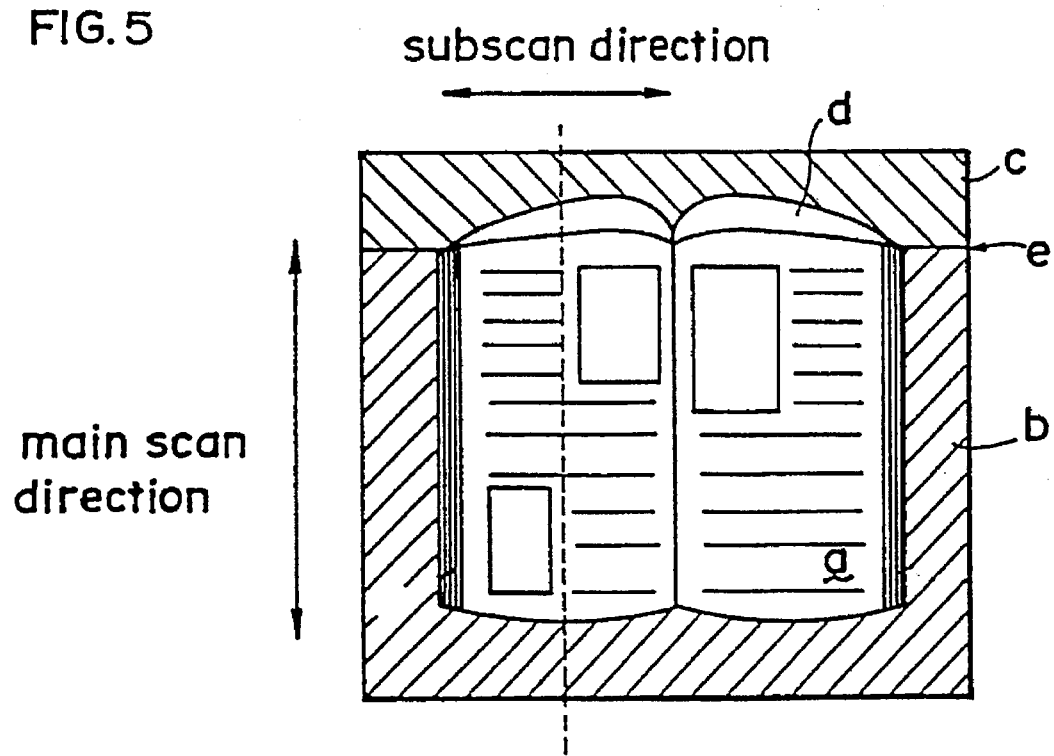
FIG. 5 shows the condition of the image data read by the image reading apparatus.

FIG. 5 shows the condition of the image data read by image sensing unit 2. In the drawing, reference symbol a refers to document surface 10a, reference symbol b refers to the image of document platen 1, reference symbol c refers to the image of the background reflected in mirror 5, reference symbol d refers to the image of document head 10b reflected in mirror 5, and reference symbol e refers to the standard position of the document. Image a of the document surface and image d of the document head 10b are read in a curve in the main scan direction due to change in the height of the document. Document surface 10a and document head 10b are read as white because paper is typically near white in color. In contrast, the background image c reflected in mirror 5 and document platen 1 which is colored darker than the document background reflect little light and are therefore read as black.

Figure 6:
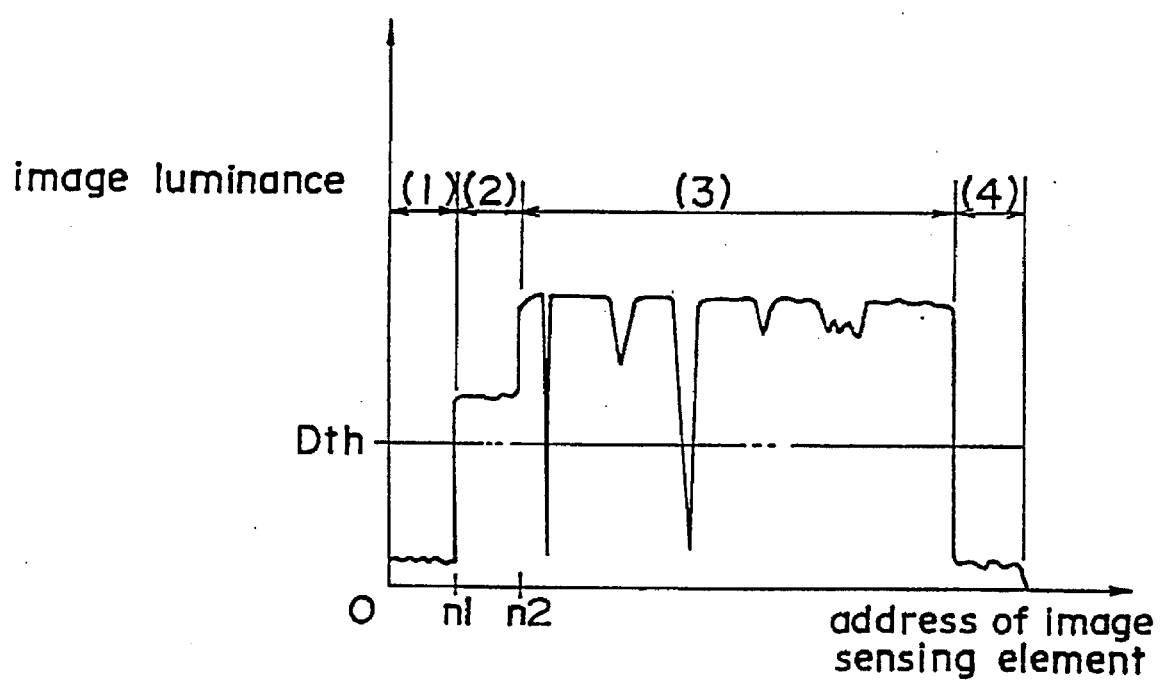
FIG. 6 shows an example of 1-line output in the main scan direction read by a CCD line sensor.

FIG. 6 shows the condition of 1-line output in the main scan direction read by line sensor 7. In this example, the image at the position described by the dashed line in FIG. 5 is read by line sensor 7. The address of the image sensing element of line sensor 7 on the horizontal axis and the output of each pixel on the vertical axis .(image luminance) are obtained. In the drawing, reference number (1) corresponds to image c of the background reflected in mirror 5, reference number (2) corresponds to image d of document head 10b reflected in mirror 5, reference number (3) corresponds to image a of document surface 10a, and reference number (4) corresponds to image b of document platen 1. Reference symbol Dth is a predetermined threshold for discriminating other images. Reference symbol n1 is the minimum address value in the image sensing elements having output which exceeds threshold Dth, i.e., a value expressing the position of the top edge of image 11 of document head 10b. Reference symbol n2 is the address value of the image sensing element corresponding to the standard position of the document, and is a fixed value. (N2−n1) is the number of pixels corresponding to the document height used in the height detection process. The height distribution of the document (refer to FIGS. 9 and 14) is determined from the value of (n2−n1) of each line. From this height distribution are calculated the image distortion correction coefficient for correcting distortion of the image arising from changes in the document height, and auto focus (AF) control data for driving the image forming lens 6 in vertical directions.

Figure 7:
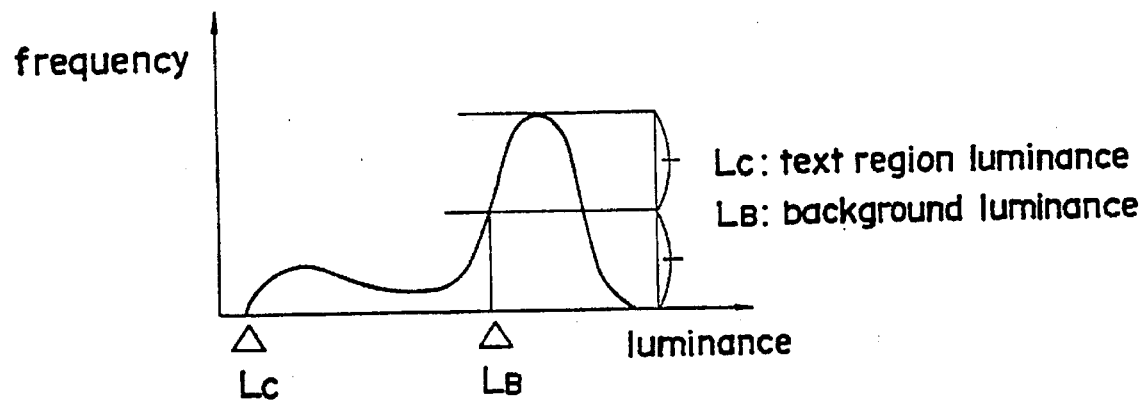
FIG. 7 shows a luminance histogram generated by 1-line image data read by the CCD line sensor.

FIG. 7 shows a luminance histogram generated based on image data of a particular 1-line of data obtained by the reading operation of line sensor 7. The luminance distribution of a document mainly of text forms a standard distribution focused on the luminance of the text region and the luminance of the background region. Accordingly, the luminance of the text region and the luminance of the background region can be determined based on the luminance distribution. To this end, the peak frequency on the high side of luminance is determined, and the luminance value of less than ½ this peak frequency is detected, and this luminance value LB is set as the document background luminance of that line. The luminance Lc of the text region is the lowest luminance value in the luminance distribution. Conversion from luminance to density is accomplished using the following general conversion method.

$$D = \log 1/R$$

(Where D is the luminance value, and R is the density value.)

Figure 8:
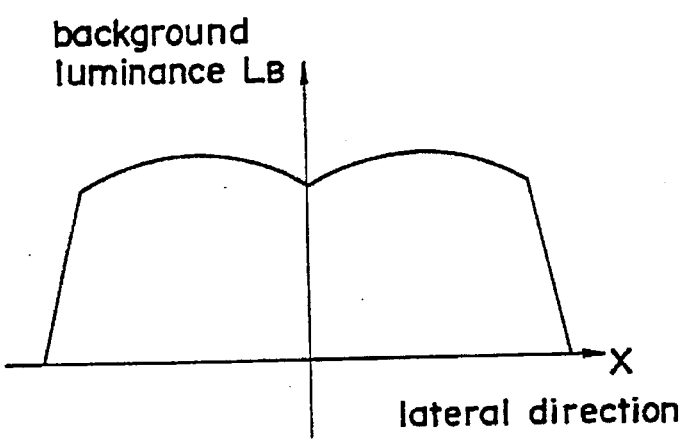
FIG. 8 shows the background luminance distribution of 1-line of a document obtained from the luminance histogram.

FIG. 8 shows the background luminance distribution of one page of book document 10 obtained from the aforesaid luminance histogram. Since the center portion of book document 10 has a lower height, the distance from illumination unit 3 and image sensing unit 2 is farther, and the background luminance has a low value due to the inclination of the document surface. The right and left edges of book document 10 similarly have low background luminance values when, in addition to the aforesaid reason of the center region, the pages yellowed or sunburned to the affects of direct exposure to sunlight, particularly in the case of old books.

The detection of anomalies in the document height distribution of the image reading apparatus of the present embodiment is described below. Since detection of document height produces data discriminating the document head 10b as "white" and the background as "black," it is possible that anomalies may occur in the detection data when the luminance area confuses the boundary of said areas.

FIG. 9(a) shows the distribution of data of document height (H) relative to the lateral direction (X) of a detected document, and is an example of anomalies occurring in part of the detection data. For example, when a label or the like is adhered to the top portion of a book, that portion is determined to be "white" via the reflection in mirror 5, and a noncontinuous bulge occurs in the height distribution. Conversely, when a stamp or the like is pressed on the document head 10b, that portion is determined to be "black," and a noncontinuous dip occurs in the height distribution (not illustrated). Since a relatively narrow dip an bulge are produced by the label and stamp, the difference relative to adjacent data is determined, and if said difference is greater than a constant value, said data is determined to be anomalous.

The present applicants have considered that the change in height of the document surface of a book or the like is often less than an angle of about 60° when characteristics such as the binding region are omitted. Thus, if the difference ΔH of adjacent data is greater than double the data interval ΔX, that portion is determined to be anomalous. Although the height change of document surface 10a is large at the binding and the right and left edges, the detection accuracy can be quite high if the center region of the page having a small height change is used and the threshold used for discrimination is changed in accordance with the page position.

Anomalies of the document luminance distribution detection are described below. The document luminance distribution is determined by generating a histogram from the shape of which are determined background luminance and text region luminance, and when the shape of the histogram is unstable, anomalies occur in the document luminance distribution.

FIG. 9(b) shows the distribution of background luminance (LB) relative to lateral direction (X) of a detected document. For example, when a large photograph or dark region is present in a part of a document, the black/white frequency balance changes in said region, and noncontinuous areas occur in the background distribution, as shown in the drawing. In this case also, the difference between adjacent background luminance values is determined just as in the height detection, and when said difference exceeds a constant value it is determined to be anomalous.

In a typical document, since it is difficult to consider changes of background luminance of a paper midway in a page, the background luminance within a page is considered by the change in the amount of reflected light caused by a change in the height of document surface 10a. Change in the amount of reflected light is more moderate that the change in height of document surface 10a, and if the difference ΔL of adjacent luminance data is greater than the data interval ΔX, the data of that portion are determined to be anomalous. The background luminance distribution changes greatly at the binding region and left and right edges just as in the height distribution, but detection accuracy can be improved by using the center region of the page where the change in luminance is slight, and changing the threshold value for discriminating in accordance with the position of the page.

The method of cross interpolation of the height distribution and luminance distribution is described below.

Figure 11:
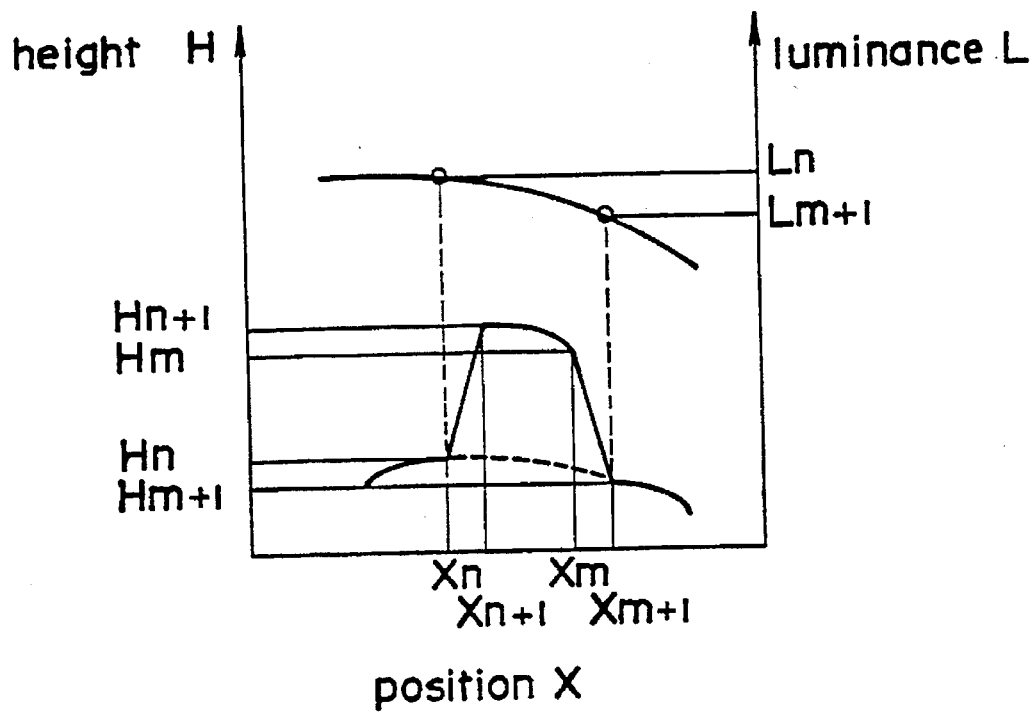
FIG. 11 illustrates the data interpolation method.

FIG. 10 shows the relationship between document height (H) and the detected background luminance (LB). The background luminance of the document is determined by the density of the paper and the height of the document. The paper of newspaper and old documents tend to yellow and therefore have low luminance values. Furthermore, colored documents such as copies made by diazo type copiers, telephone books and the like similarly have low luminance values. The surface of the high region of a thick document approaches the illumination unit 3 and image sensing unit 2 and, therefore, the amount of reflected light increases so as to increase the luminance value, whereas the low portions of the document have lower luminance value. Thus, a primary interrelationship exists between the document height and the detected background luminance of a document, as shown in FIG. 11, said interrelationship being expressed by Equation 1 below.

$$LB = A \times H + B$$

(Where LB is the background luminance, H is the document height, and A and B are constants.)

This relationship can be expressed both by determining document height and luminance values at two pints, and by determining the values of constant A and constant B. In anomaly detecting in .the previously described height distribution and luminance distribution, interpolation can be performed using data of normal regions other than the data of the region of the suspected anomaly by determining the data at two points of the normal regions adjacent to the region with the anomaly, and calculating from said data the interrelationship of the document height and background luminance.

FIG. 11 illustrates the method of data interpolation. In the drawing, when anomalies occur between Hn and Hn+1, and Hm and Hm+1 in the height distribution, the anomaly interval is between position Xn+1 and Xm, and both adjacent heights Xn and Xm+1 are normal. When the luminance values of the normal intervals are checked and there are no anomalies, interpolation is accomplished using corresponding luminance values Ln and Lm+1. Since there is a correlation between the height distribution and luminance distribution as previously described, constant A and constant B can be determined using Equation 2 below.

$$Ln = A \times Hn + B$$

$$Lm+1 = A \times Hm+1 + B$$

When constant A and constant B are determined, the height of the anomaly interval (from Xn+1 to Xm) can be determined from the background luminance value using Equation 1. Similarly, even when the luminance distribution is anomalous, it is possible to accomplish the same interpolation if the height is accurate. When the corresponding luminance distribution and height distribution include anomalies, interpolation is impossible and the image sensing operation is interrupted and a warning is displayed on the operation panel.

The image processing method of the image reading apparatus is described below.

Figure 12:
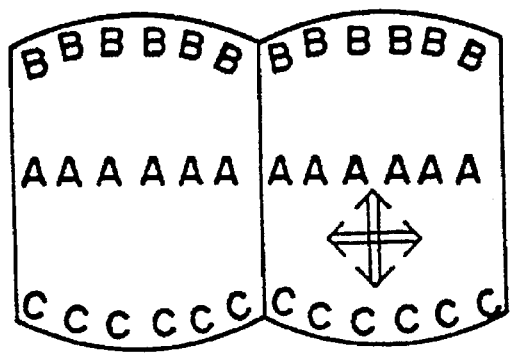
FIG. 12 shows the state of image distortion.

FIG. 12 shows image distortion. When a solid document is read from above, image distortion is generated vertically and laterally. This distortion causes the object to become larger when the document is nearer to the image sensor (document is higher), and conversely causes the object to become smaller when the document is farther from the image sensor, similar to the perception of visual perspective experienced by people. At a region where a page is inclined such as the binding region of a document, the document image is compressed laterally due to said inclination. In the present embodiment, image distortion is corrected by continuously controlling the magnification in the main scan direction and subscan direction using the interpolated document height distribution and the image processing circuit 25 (refer to FIG. 16) which is capable of optionally changing the imaging magnification bidirectionally in the main scan and subscan directions.

Figure 13:
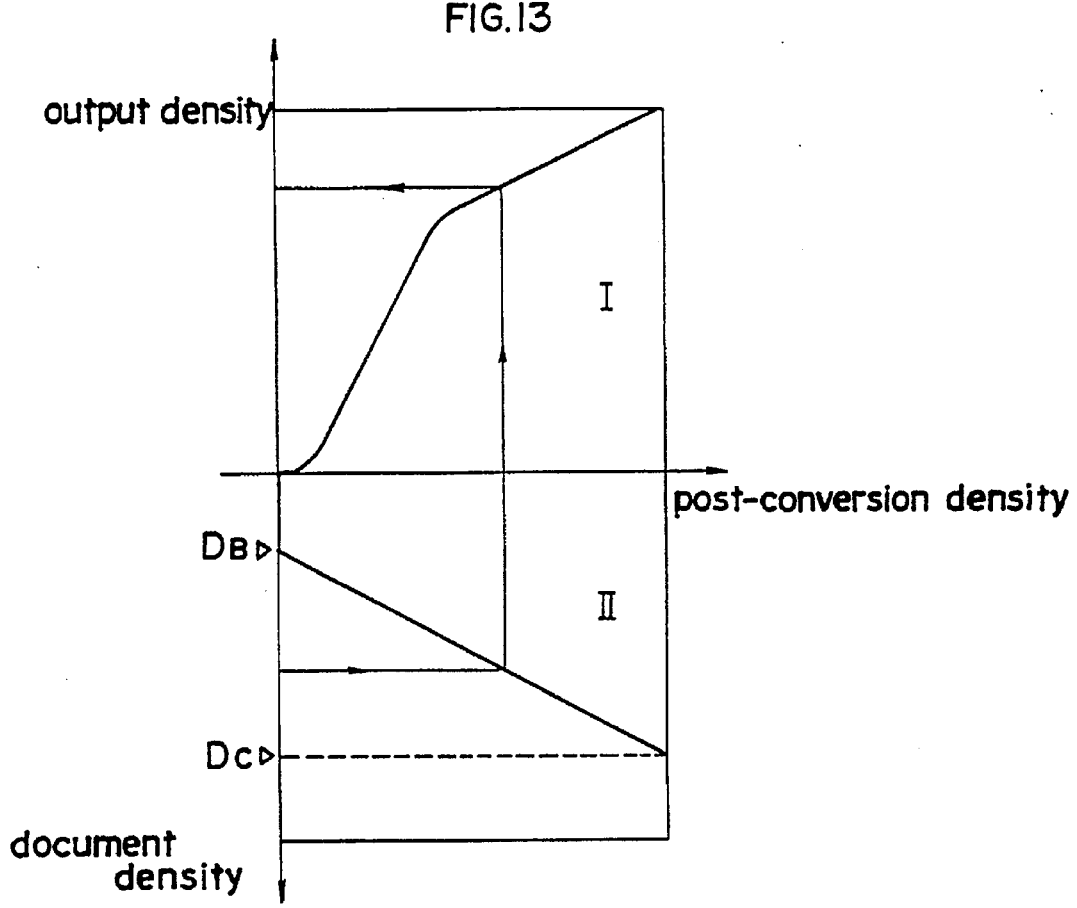
FIG. 13 illustrates the method of correcting the reproduced density of an image.

FIG. 13 illustrates the method of correcting the reproduced density of the image; the lower vertical axis is the document density, the horizontal axis is the post-conversion density, and the upper vertical axis is the output density; quadrant II is a conversion table using a gamma conversion function to determine the optimum image reproduction range (dynamic range) based on read image data. The conversion method is determined so as to reproduce the linearity between the detected background density and text density. The reproduction range can be set via said conversion so as to achieve the lowest density for background density for the highest density of the text density of the read document. Quadrant I is a gamma conversion table (nonlinear conversion characteristics) designed to obtain output of a desired image; the slope of output density in the low density range is set in order to improve the reproducibility of thin text, and the slope of output density is relaxed in the intermediate density range to improve the reproducibility of photographs.

Figure 14:
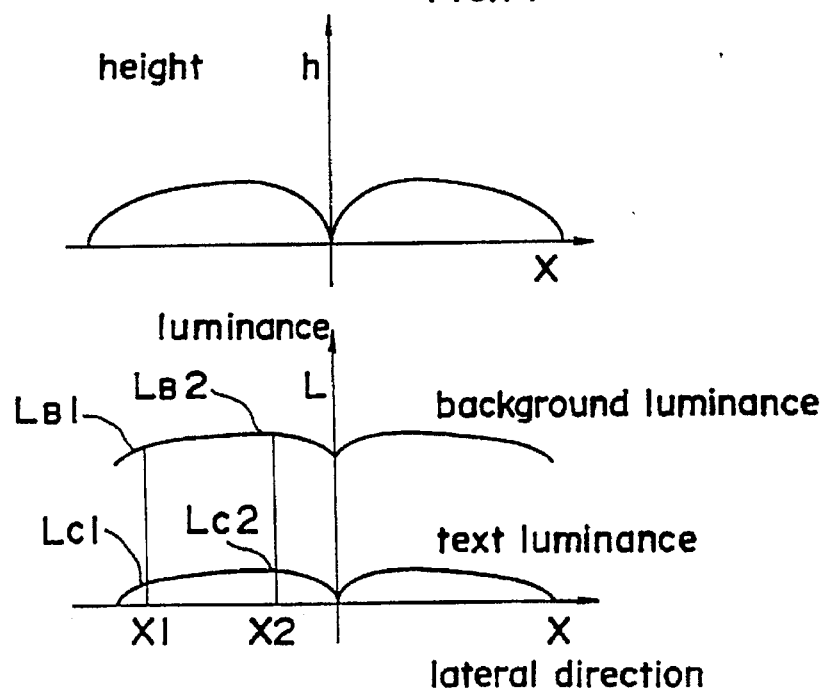
FIG. 14 shows the document height. Characters, and background luminance of a document in the subscan direction.
Figure 15:
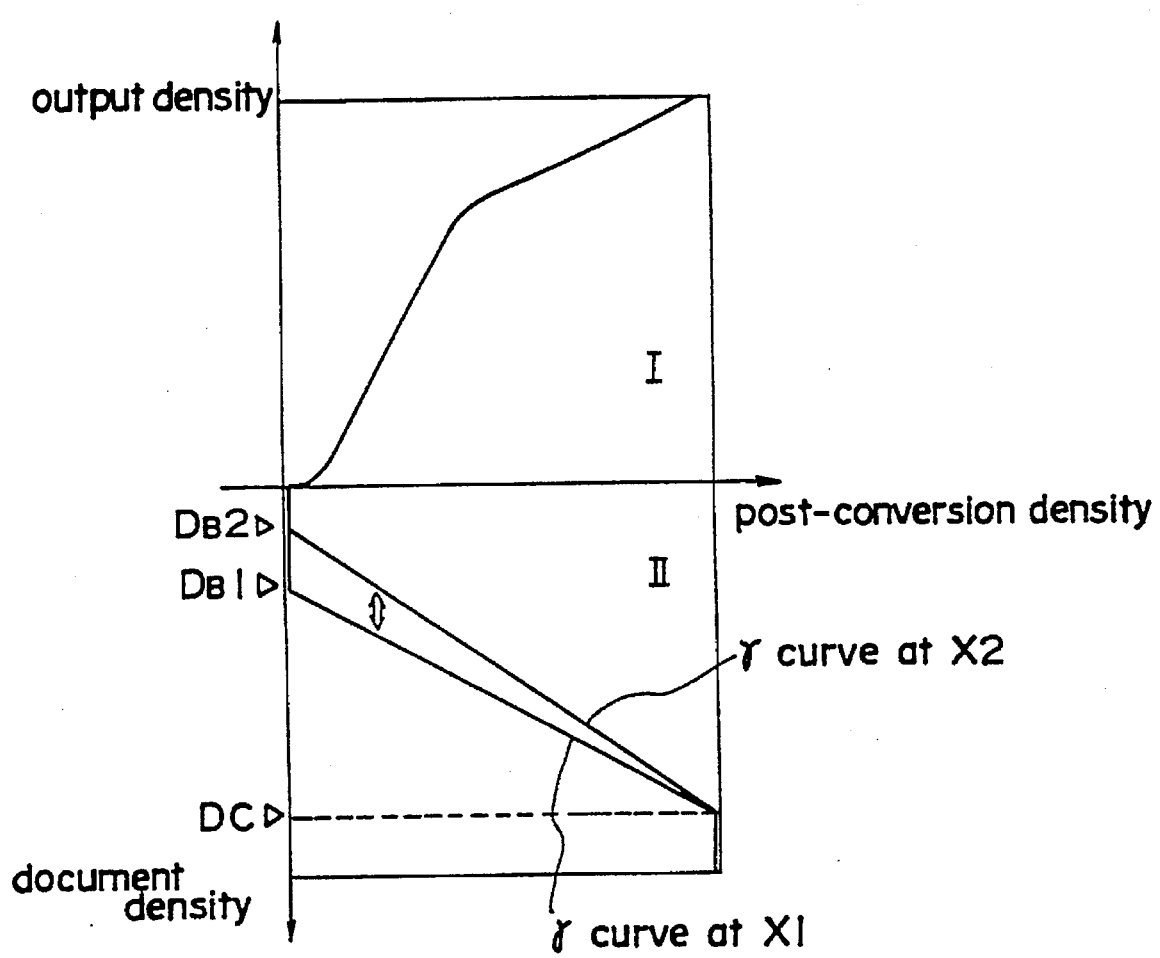
FIG. 15 illustrates the method of correcting the reproduced density of the image.

FIGS. 14 and 15 show the method for dynamically controlling the gamma conversion coefficient for auto correction of the reproduced density of an image in the same document. Image reading apparatus 1 detects the luminance distribution of the background and text region in the subscan direction of the document via a prescan operation. FIG. 14 shows the distribution of luminance values of the text and background regions, and the document height in the subscan direction of the document obtained when the prescan operation ends. There is a constant correlation between the change in luminance and the change in document height. FIG. 15 is a conversion illustration of the gamma conversion coefficient for determining the optimum image reproduction range (dynamic range) based on the aforesaid luminance distribution. In this example, the dynamic range in quadrant II changes continuously in accordance with background density DB and text region luminance Dc based on the background luminance LB and text region luminance Lc in the subscan direction, so as to normally provide uniform control of the reading dynamic range, and reproduce a uniform image in all areas of the document.

Figure 16:
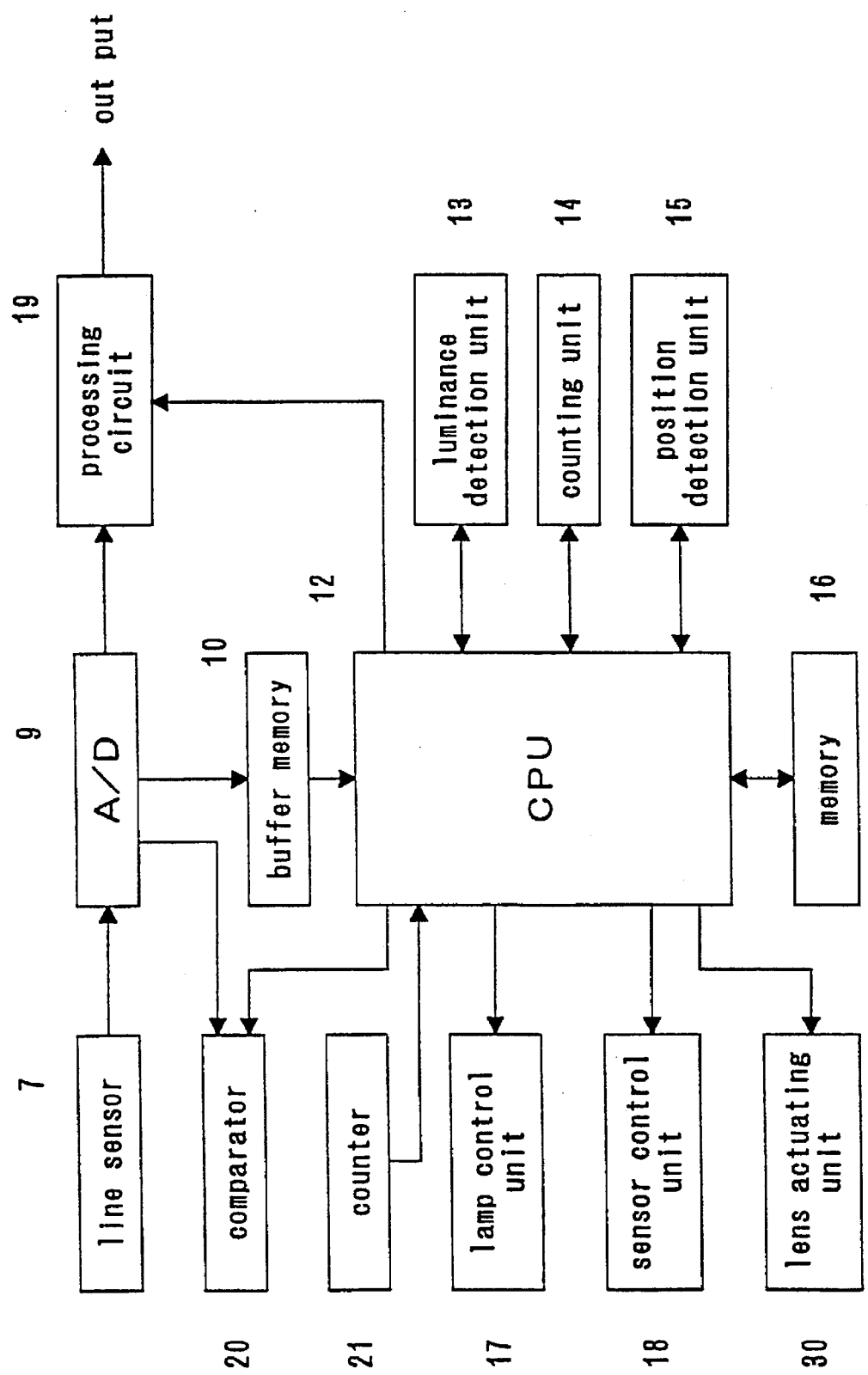
FIG. 16 is a block circuit diagram of the image reading apparatus.

FIG. 16 is a block circuit diagram of image reading apparatus 1 of the present embodiment. The output of the read image via line sensor 7 is subjected to digital conversion by analog-to-digital (A/D) converter 9, and input to buffer memory 10 and comparator 20. Central processing unit (CPU) 12 provides all controls of the apparatus, and has various processing functions such as height distribution anomaly detection, luminance distribution anomaly detection, and data correction. CPU 12 transmits data stored in buffer memory 10 to luminance detection unit 13 which generates a luminance histogram which is calculated the background luminance LB and text region luminance Lc of the document. Counting unit 14 counts the number of pixels wherein the luminance value is less than the text region threshold value (a value greater than the text region luminance Lc by a predetermined amount), and the text region frequency distribution is determined from said count value. Position detection unit 15 detects information of the left and right positions of the document currently positioned at line sensor 7. Memory 16 stores the calculated or detected document height and luminance and the like. Lamp control unit 17 controls the actuation of the lamp of illumination unit 3, and sensor control unit 18 controls the movement of line sensor 7 in the subscan direction.

CPU 12 both controls the operation of image processing circuit 19, and presets the threshold values for luminance in comparator 20, and sets counter 21 when data exceeding the threshold value of comparator 20 are input from line sensor 7. CPU 12 determines the document height distribution from the minimum and maximum values of the count values of counter 21. CPU 12 extracts portions determined to be anomalous from both the document height distribution and luminance distribution determined as previously described, and interpolates data of said anomalous portion using other correct data. Image processing circuit 19 comprises various types of digital conversion circuits such as variable magnification circuit for correcting image distortion and gamma conversion circuit for changing image density, and accomplishes predetermined image processing and output the image data following said image processing.

Figure 17:
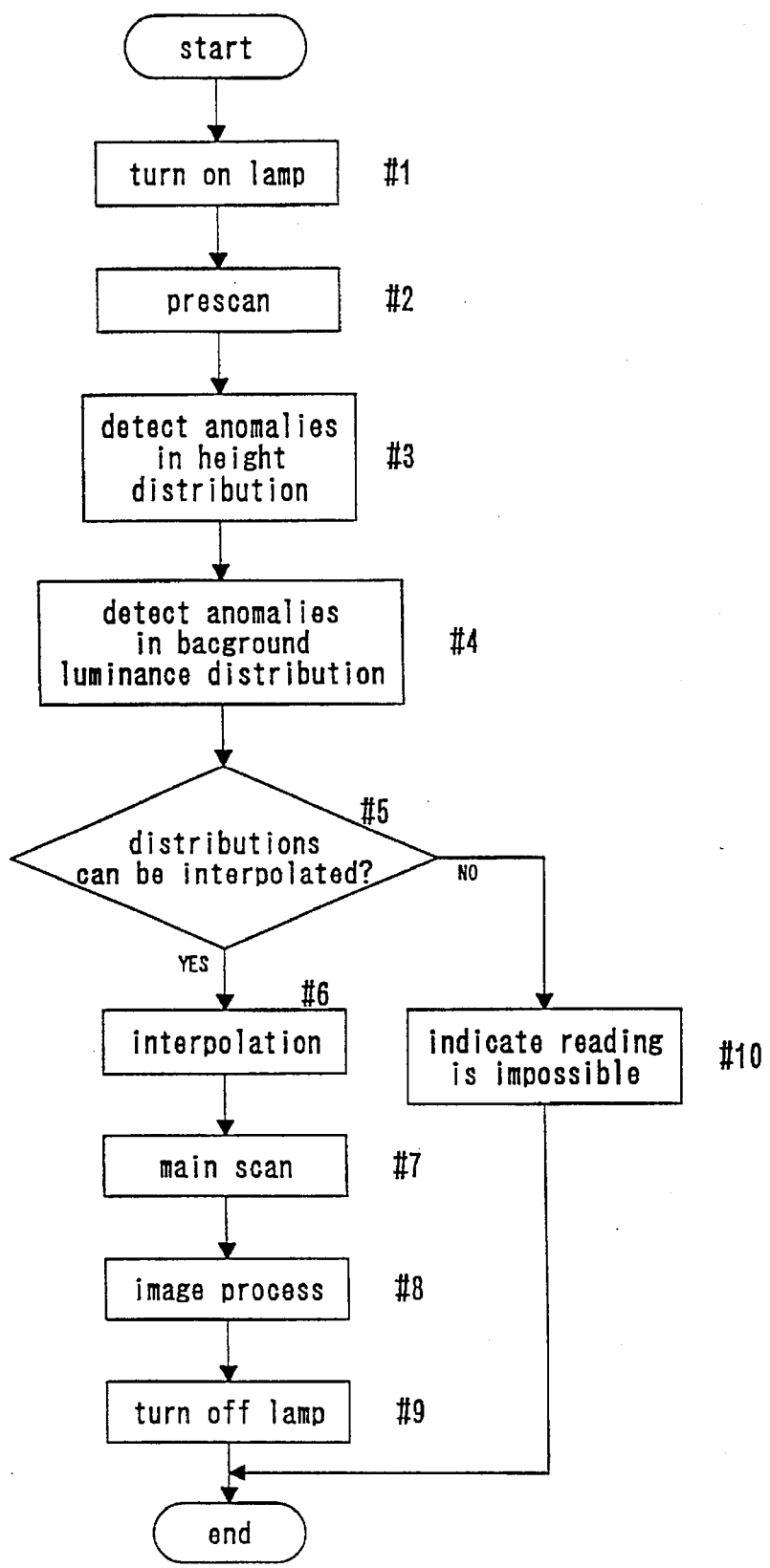
FIG. 17 is a flow chart of the reading operation of the image reading apparatus.

FIG. 17 is a flow chars showing the reading operation of the image reading apparatus. When a reading operation start command is input, CPU 12 turns ON the lamp of illumination unit 3 via lamp control unit 17 to illuminate book document 10 (#1). Then, prescanning starts (#2). In this prescan, the height distribution and luminance distribution are obtained. Details of these operations are described below with reference to FIGS. 18 through 20. When the prescan ends, detection of anomalies in the height distribution obtained in the prescan is accomplished by determining the difference between adjacent heights. When an anomaly occurs, the positions Xn and Xm+1 in the subscan direction are stored in memory 16 (#3). Similarly, detection of anomalies in the luminance distribution is next accomplished, and the positions X'n and X'm+1 of the anomaly are stored in memory 16 (#4). Then, a determination is made as to whether or not the document height distribution and luminance distribution can be cross-interpolated by checking whether or not the anomalies are important based on the position Xn and Xm+1, and position X'n and X'n+1 stored in memory 16 (#5). If cross-interpolation is possible, interpolation is accomplished by the method described in FIG. 12 using correct data, and after interpolation is completed, the height distribution or luminance distribution is stored in memory 16 (#6). When this operation ends, the line sensor 7 scans in the reverse direction to the prescan direction to accomplish the main scan of the document (#7). In the main scan, image distortion and density are corrected by controlling image processing circuit 18 based on the corrected height distribution and luminance distribution while the document is read (#8). Finally, the lamp is turned OFF (#9), and the image reading process ends.

In the determination of whether or not cross-interpolation is possible in step #5, when, for example, a label is affixed to the photograph portion of a document, anomalies occur in both the height distribution and luminance distribution at the same position in the document so as to make data correction impossible, the reading operation is stopped, and the user is alerted that image reading is impossible (#10).

Figure 18:
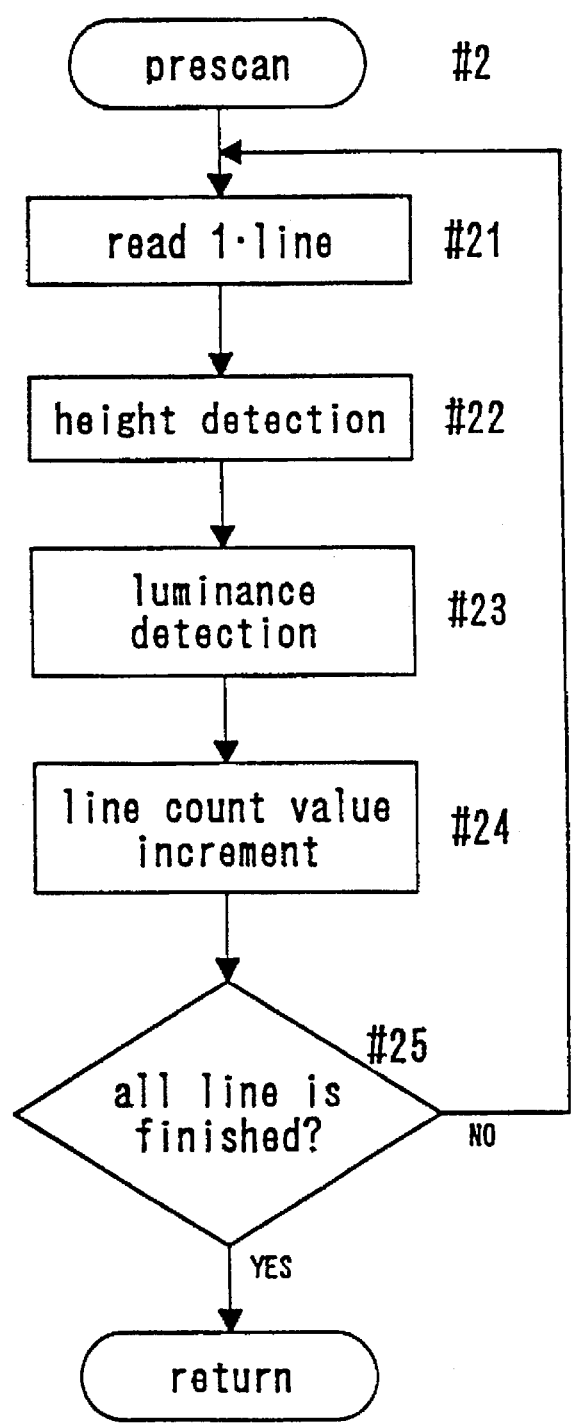
FIG. 18 is a flow chart of the prescan in FIG. 17.
Figure 19:
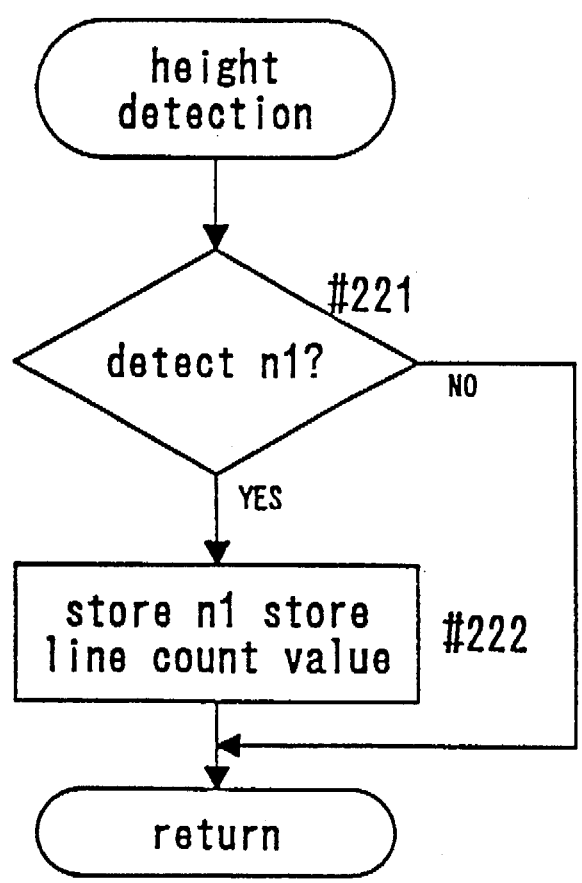
FIG. 19 is a flow chart of the height detection in FIG. 18.
Figure 20:
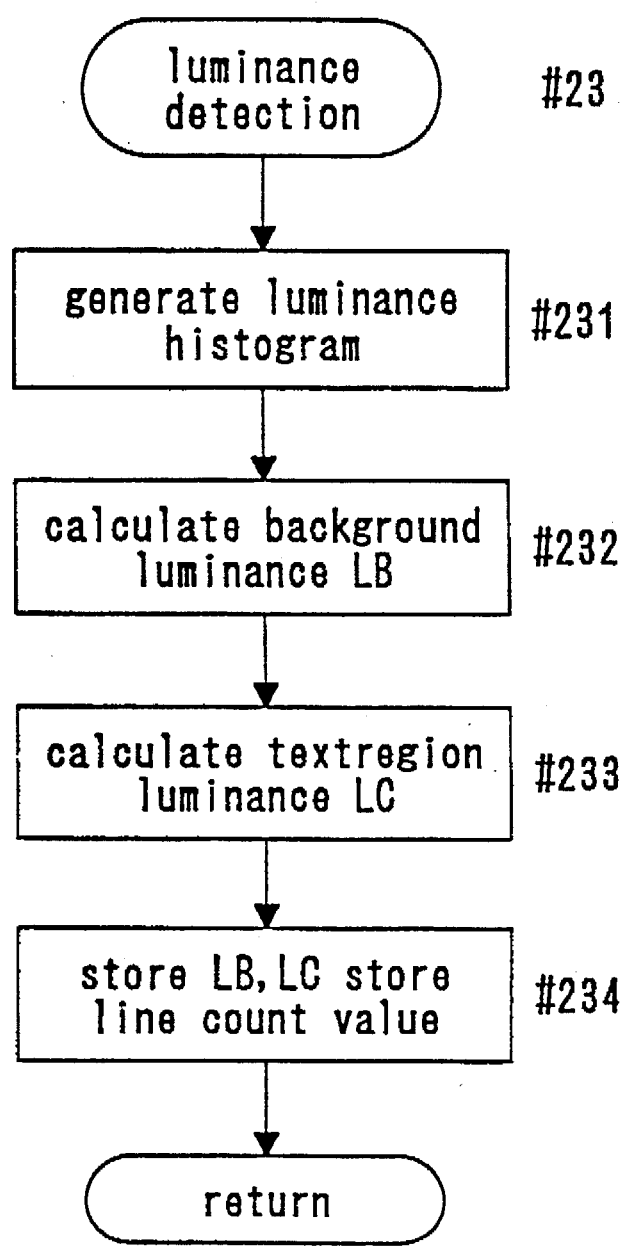
FIG. 20 is a flow chart of the luminance detection in FIG. 18.

Height detection and luminance detection in the prescan are described below with reference to FIGS. 18 through 20.

In the prescan, height and luminance are detected for each line. After the prescan starts, 1-line of data are read (#21). Height detection is accomplished via the read 1-line data (#22). Height detection is accomplished as indicated in the flow chart of FIG. 19. The read 1-line of data is checked to determine whether or not the output of an image sensing element exceeds the threshold Dth (#221). If output of an image sensing element exceeds the threshold Dth, the address of said image sensing element is designated n1 and stored in memory 16. The line count value in position detection unit 15 is stored in memory 16 to recognize the position of n1 in the subscan direction (#222). When n1 is not detected, the routine returns directly. Then, luminance detection is accomplished (#23). Luminance detection, is accomplished as indicated in the flow chart of FIG. 20. The read 1-line of data is sent to luminance detection unit 13 to generate a luminance histogram (#231), and background luminance LB is calculated from the luminance histogram by the previously described method (#232). Then, the text region luminance Lc is calculated in the same manner from the luminance histogram via the aforesaid method (#233). The calculated background luminance LB and text region luminance Lc are stored in memory 16. Then, the line count value in position detection unit 15 is stored in memory 16 to recognize the position of background luminance LB and text region luminance Lc in the subscan direction (#234). Thus, n1, LB, and Lc are determined, and the height distribution and luminance distribution are obtained by connecting n1, LB, and Lc of all lines at positions in the subscan direction. Then the line count value of position detection unit 15 is incremented (#24). Then a determination is made as to whether or not all lines of data have been read (#25). If all lines of data have been read, the routine returns directly. If all lines of data have not been read, a next 1-line is read (returns to #21).

FIG. 21 shows another method of detecting mutual anomalies of document height and luminance. Since there is a general correlation between document height and luminance, this characteristics can be used to detect anomalies. As shown in FIG. 21(a), the height and luminance data of the right and left positions of the document can be standardized as shown in FIG. 21(b) using mean values, and the difference between both standardized data can be determined and used to create a distribution, as shown in FIG. 21(c). The location of the greatest difference of said distributions is the location of the anomalous data of either height or luminance. Thus, the precision of anomaly detection can be improved by synthesizing this result with the previously described independent anomaly detection results. This method is particularly efficacious when eliminating anomalies arising at locations at which the independent detection threshold values cannot be increased due to a large change in correct data caused by the binding region at the center of a book document.

According to the present invention as described above, when various noise levels are detected for document height and luminance in an image reading apparatus for reading book-like documents and one such noise level exceeds an allowed range, it can be detected as an anomaly and the anomalous data of said portion can be cross-interpolated using other data to produce correct data, and allow reproduction of images of excellent quality without distortion or irregular density.

Although the present invention has been fully described by way of examples with reference to the accompanying drawings, it is to be noted that various changes and modifications will be apparent to those skilled in the art.

Therefore, unless otherwise such changes and modification depart from the scope of the present invention, they should be construed as being included therein.

What is claimed is:

1. An image reading apparatus which reads document surface of open book-like document placed on a document platen in a face upward condition, said image reading apparatus comprising:

an image reader which reads the document to output image data;

first detecting means for detecting a background luminance of the document in accordance with the image data;

second detecting means for detecting a height of document;

first determining means for determining a first background luminance distribution based on the background luminance of the document detected by the first detecting means;

second determining means for determining a height distribution based on the height of document detected by the second detecting means;

anomalies detecting means for detecting anomalies of the first background luminance distribution;

converting means for converting the height distribution into a second background luminance distribution;

interpolating means for interpolating the anomalies of the first background luminance distribution using the second background luminance distribution;

density control means for controlling a density of the image data in accordance with the background luminance distribution interpolated by the interpolating means.

2. The image reading apparatus as claimed in claim 1, wherein said second detecting means comprises a mirror reflecting side of view of the document to said image reader.

3. The image reading apparatus as claimed in claim 1, wherein said anomalies detecting means further detects positions of anomalies in the first background luminance distribution, and said interpolating means interpolates the anomalies of the first background luminance distribution, using the second background luminance distribution corresponding to positions of anomalies of the first background luminance distribution.

4. The image reading apparatus as claimed in claim 1, further comprising warning means for warning an impossibility of reading when the interpolating is impossible.

5. The image reading apparatus as claimed in claim 4, wherein said anomalies detecting means further detects anomalies of the height distribution and its positions, and said warning means warns an impossibility of reading when the anomalies of the height distribution and the anomalies of the first background luminance distribution are generate in the same position of the image data.

6. An image reading apparatus which reads document surface of open book-like document placed on a document platen in a face upward condition, said image reading apparatus comprising:

an image reader which reads the document to output image data;

first detecting means for detecting a background luminance of the document in accordance with the image data;

second detection means for detecting a height of document;

first determining means for determining a background luminance distribution based on the background luminance of the document detected by the first detecting means;

second determining means for determining a first height distribution based on the height of the document detected by the second detecting means;

anomalies detecting means for detecting an anomalies of the first height distribution;

converting means for converting the background luminance distribution into a second height distribution;

interpolating means for interpolating the anomalies of the first height distribution using the second height distribution;

image distortion correcting means for correcting distortion of the image data caused by the height of the document in accordance with the height distribution interpolated by the interpolating means.

7. The image reading apparatus as claimed in claim 6, wherein said second detecting means comprises a mirror reflecting side of view of the document to said image reader.

8. The image reading apparatus as claimed in claim 6, wherein said anomalies detecting means further detects positions of anomalies in the first height distribution, and said interpolating means interpolates the anomalies of the first height distribution, using the second height distribution corresponding to positions of anomalies of the first height distribution.

9. The image reading apparatus as claimed in claim 6, further comprising warning means for warning an impossibility of reading, when the interpolating is impossible.

10. The image reading apparatus as claimed in claim 9, wherein said anomalies detecting means further detects anomalies of the background luminance distribution and its positions, and said warning means warns an impossibility of reading when the anomalies of the background luminance distribution and the anomalies of the first height distribution are generate in the same position of the image data.

11. An image reading apparatus which reads document surface of open book-like document placed on a document platen in a face upward condition and detects height of the document, said image reading apparatus comprising:

an image reader which reads the document to output image data;

first detecting means for detecting a background luminance of the document in accordance with the image data;

second detecting means for detecting a height of document;

first determining means for determining a background luminance distribution based on the background luminance of the document detected by the first detecting means;

second determining means for determining a height distribution based on the height of document detected by the second detecting means;

first anomalies detecting means for detecting anomalies of the background luminance distribution;

second anomalies detecting means for detecting anomalies of the height distribution;

converting means for converting the height, distribution and the background luminance distribution each other;

interpolating means for interpolating each anomalies of the distributions using the other distribution converted by converting means;

warning means for warning an impossibility of reading when the interpolating is impossible.

12. The image reading apparatus as claimed in claim 11, wherein said warning means warns an impossibility of reading when the anomalies of the height distribution and the anomalies of the background luminance distribution are generate in the same position of the image data.

13. The image reading apparatus as claimed in claim 11, wherein said second detecting means comprises a mirror reflecting side of view of the document to said image reader.

14. The image reading apparatus as claimed in claim 11, wherein said anomalies detecting means detects positions of anomalies, and said interpolating means interpolates the anomalies of the background luminance distribution using the height distribution converted into the background luminance distribution corresponding to positions of anomalies of background luminance distribution.

15. The image reading apparatus as claimed in claim 11, wherein said anomalies detecting means detects positions of anomalies of the height distribution, and said interpolating means interpolates the anomalies of the height distribution using the background luminance distribution converted into the height distribution corresponding to positions of anomalies of height distribution.

16. A method of processing an image of an open book-like document placed on a document platen in a face upward condition, the method comprising the step of:

reading the document to output image data;

detecting a background luminance of the document in accordance with the image data;

detecting a height of document;

determining a first background luminance distribution based on the background luminance of the document detected by background luminance detecting step;

determining a height distribution based on the height of document detected by height detecting step;

detecting anomalies of the first background luminance distribution;

converting the height distribution into a second background luminance distribution;

interpolating the anomalies of the first background luminance distribution using the second the background luminance distribution;

controlling a density of the image data in accordance with the background luminance distribution interpolated by the interpolating step.

17. A method of processing an image of an open book like document placed on a document platen in a face upward condition, the method comprising the step of:

reading the document to output image data;

detecting a background luminance of the document in accordance with the image data;

detecting a height of document;

determining a background luminance distribution based on the background luminance of the document detected by background luminance detecting step;

determining a first height distribution based on the height of the document detected by height detecting step;

detecting an anomalies of the first height distribution;

converting the background luminance distribution into a second height distribution;

interpolating the anomalies of the first height distribution using the second height distribution;

correcting distortion of the image data caused by the height of the document in accordance with the height distribution interpolated by the interpolating step.

18. A method of processing an image of an open book like document placed on a document platen in a face upward condition, the method comprising the step of:

reading the document to output image data;

detecting a background luminance of the document in accordance with the image data;

detecting a height of document;

determining a background luminance distribution based on the background luminance of the document detected by background luminance detecting step;

determining a height distribution based on the height of document detected by height detecting step;

detecting anomalies of the background luminance distribution;

detecting anomalies of the height distribution;

converting the height distribution and the background luminance distribution each other;

interpolating each anomalies of the distributions using the other distribution converted by converting step;

warning an impossibility of reading when the anomalies of the height distribution and the anomalies of the background luminance distribution are generate in the same position of the image data.

* * * * *

UNITED STATES PATENT AND TRADEMARK OFFICE
CERTIFICATE OF CORRECTION

PATENT NO. :     5,659,404
DATED      :     August 19, 1997
INVENTOR(S) :    Shinya MATSUDA It is certified that error appears in the above-indentified patent and that said Letters Patent is hereby corrected as shown below:

Col, 11,    Line 5, after "height" delete ","--

Signed and Sealed this

Twenty-second Day of September, 1998

Attest:

BRUCE LEHMAN

Attesting Officer     Commissioner of Patents and Trademarks